June 5, 1928. 1,672,354
O. TYBERG
POWER TYPEWRITER
Filed March 6, 1925 7 Sheets-Sheet 2

INVENTOR
Oluf Tyberg

June 5, 1928.  
O. TYBERG  
1,672,354  
POWER TYPEWRITER  
Filed March 6, 1925  
7 Sheets-Sheet 6

INVENTOR  
Otto Tyberg

Patented June 5, 1928.

1,672,354

UNITED STATES PATENT OFFICE.

OLUF TYBERG, OF POINT LOMA, CALIFORNIA.

POWER TYPEWRITER.

Application filed March 6, 1925. Serial No. 13,613.

This invention relates to power typewriters and similar machines and consists of an improved carriage construction, of new and useful mechanisms for operating the carriage, and for controlling these mechanisms from the keyboard. The objects of the invention is to make the carriage motions simple and durable, and to facilitate the work of the operator in the manipulation of the machine.

While this invention may be utilized in connection with different styles of machines, it is here shown applied to the "typewriter movement" disclosed in my application—Ser. No. 564,644 filed May 29, 1922, and presents a machine embodying the following distinguishing features.

On a continuously rotated carrier or driver (13) is mounted a typewheel, which is made to strike against a stationary platen. On this rotary carrier is also mounted an armed sleeve (19) normally revolving with it, but capable of being intermittently arrested at different points of the rotation, and when so arrested, it transmits a motion to a rockshaft (80) by means of plunger (29) situated in the rotary carrier. This rockshaft, which is mounted on the frame of the machine is adapted to operate three distinctly separate mechanisms, namely (1) the printing mechanism that causes the typecarrier to strike the platen, and which has been more fully disclosed in my application Ser. No. 4,938—filed Jan. 26, 1925, and merely outlined in the accompanying drawings. (2) The carriage spacing mechanism, and (3) the paper line-feed mechanism. In addition my invention embodies an independent mechanism for returning the carriage by a running motion to be operated in connection with the above referred to line-feed mechanism, and which discloses new and useful features for lock-stopping the carriage accurately and without jar at the end of its return and also means for regulating the amount of line-feeding.

Other features disclosed in my drawings will be more fully dealt with in the following specification, and the invention accordingly consists of the features of construction, combinations of elements and arrangements of parts, which will now be described in detail on reference to the following drawings.

In the accompanying drawings, consisting of seven sheets.

Figures 1, 2:
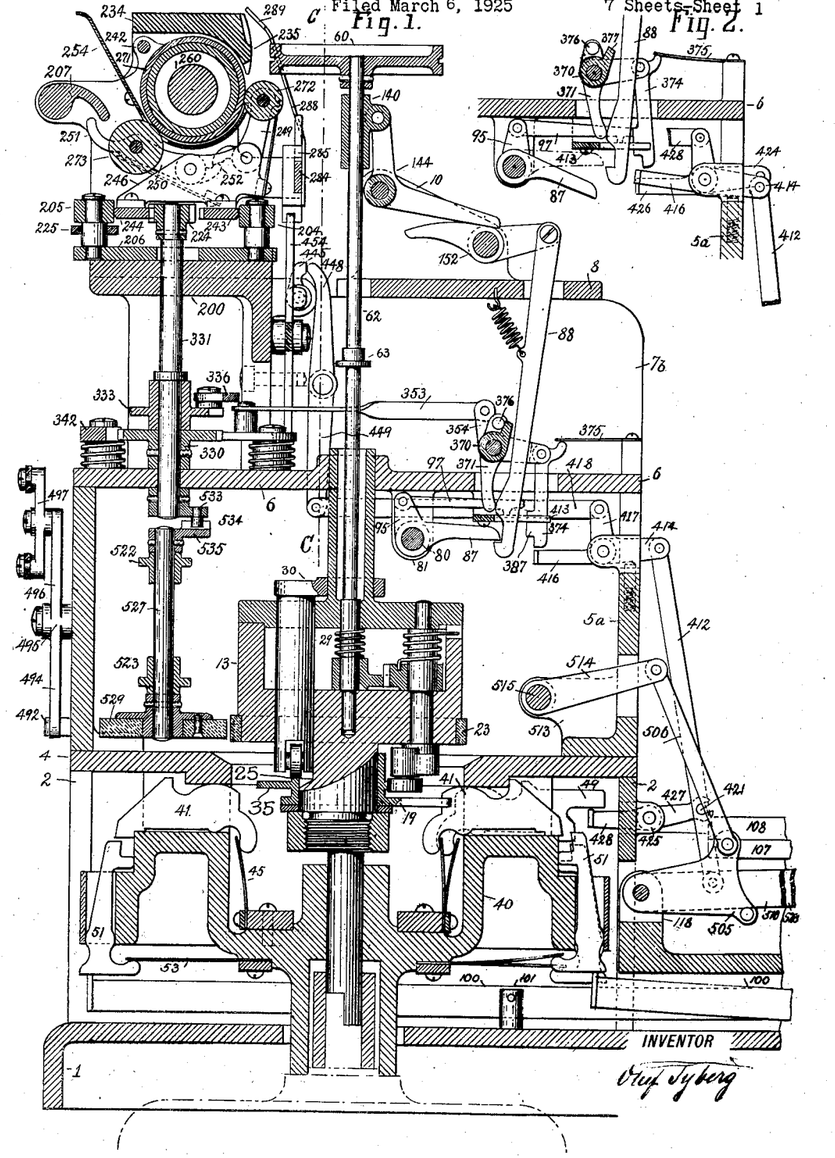
Fig. 1 is a side elevation of the machine and a center section on the lines A—A of Figs. 6 and 12.
Fig. 2 is a portion of the same view, showing the printing release motion in action.

The frame may be constructed in any suitable manner. Referring to Fig. 1, it consists of a base plate 1, upon which is mounted the casing 2. On the top of casing 2 is mounted the plate 4, to the lower side of which the pawl case 40 is fastened. This pawl case and its parts are similar in construction to the one shown and described in my application:—Ser. No. 4938, except, in place of spiral springs, I have substituted the flat springs 45 and 53 for controlling the actions of the stop-pawls 41 and the release-pawls 51.

The keyboard frame is a front extension of the casing 2, and the keyboard is divided into three sections. The two end-sections 104 and 106 contain the character keys, which act upon the keylevers 100, pivoted at 101, and are held in their normal position by their respective spring-actuated release pawls 51. In the center-section 105 are situated the control-keys. Like the character-keys the number of control-keys may be varied, as shown they consist of a "shift" key, a "reverse-control" key, a "space" key, a "feed" key, a "carriage return" key, and a "paper control" key. Each of these control-keys are respectively fastened to the levers 134, 269, 510, 520, 410 and 420, which are all pivoted at 118, and held by their respective string actions in a normal position against the underside of a plate 119, fastened to the top of the front portion of section 105. This front portion is provided with suitable slots for guiding each of the control-levers. The actions connected with each of these control-keys will be referred to hereinafter.

The rotary carrier 13—with its armed sleeve 19, provided with a face-cam 25 and a side-cam 35, that respectively control the motion of the plunger 29 and the typewheel shaft 62—is identical with that shown in my previous applications above referred to, as is also the flexible typewheel shaft and the manner of producing the printing impact against the stationary platen. The only addition to this rotary carrier is a friction band 23, attached to its outer rim, for supplying the power for the quick return of the carriage, to which references will be made hereinafter.

Figure 3:
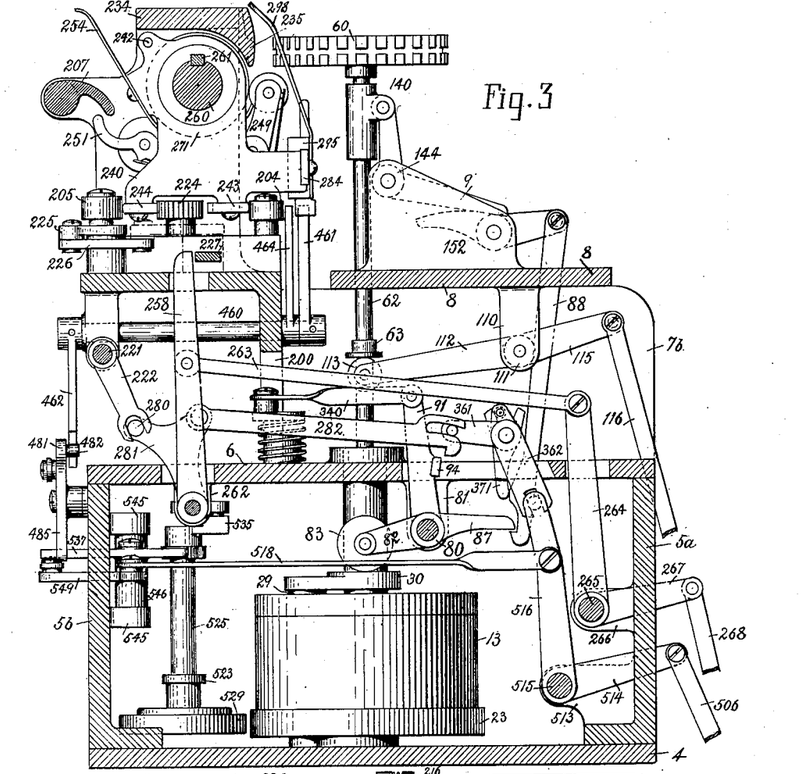
Fig. 3 is another side elevation, sectioned on the line B—B of Fig. 6.
Figure 14:
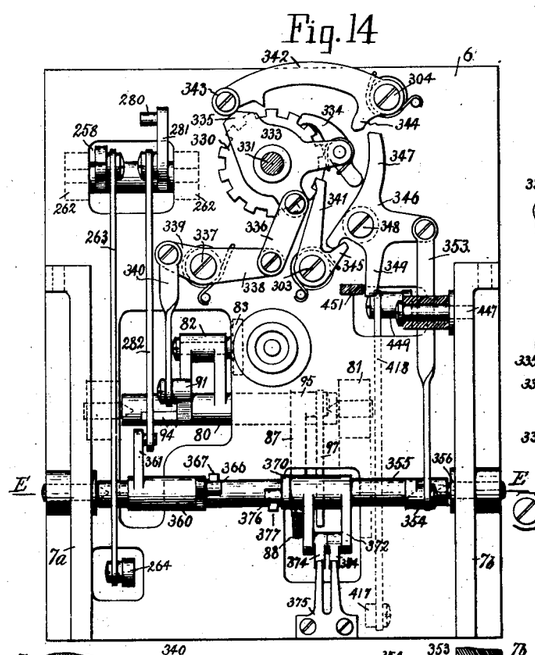
Fig. 14 is a top view of plate 6, showing the carriage feed mechanism.
Figure 17:
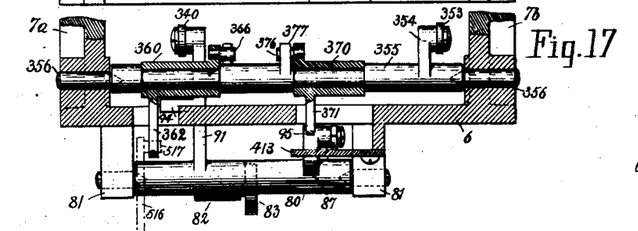
Fig. 17 shows the feed control shaft and the plate 6 in section on the line E—E of Fig. 14.
Figure 18:
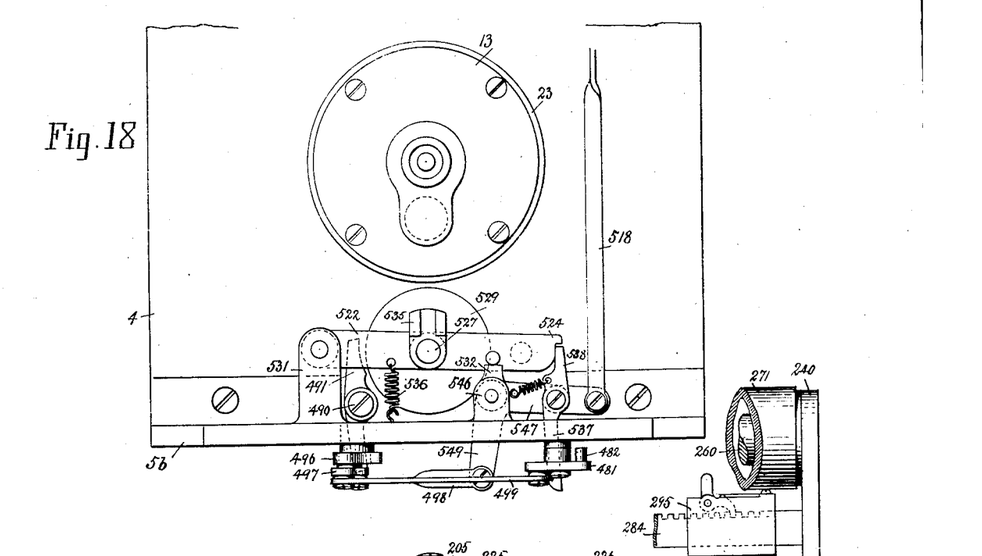
Fig. 18 is a top view of the machine below plate 6.
Figure 19:
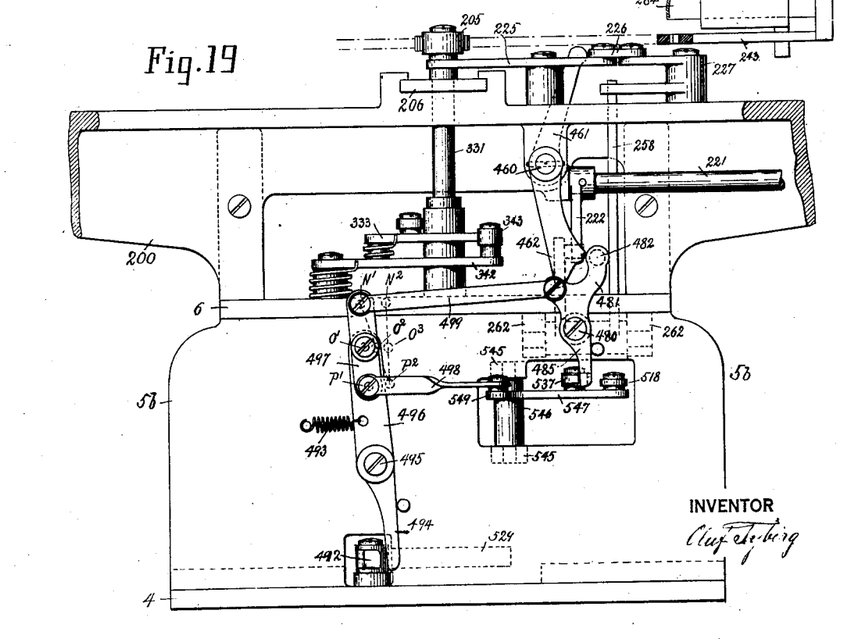
Fig. 19 is a rear view of the machine, showing parts of the carriage return mechanism.

On plate 4 is mounted a front angle-piece $5^a$ and a rear angle-piece $5^b$, which together support the plate 6. On the underside of plate 6 is situated the actuating rockshaft 80, mounted between lugs 81. (Figs. 3, 14 and 17.) The arm 82 of this rockshaft is provided with a roller 83, resting on the cap 30 of plunger 29, and from which the actuating rockshaft 80 receives its motion as already explained in my prior applications. The other three arms 87, 91 and 95 on this actuating rockshaft will each be referred to hereinafter.

The plate 6 is provided with two uprights $7^a$ and $7^b$. To the top of these uprights is fastened the plate 8, provided with a pair of uprights 9 and 10, (Figs. 1, 3 and 10) in which the printing mechanism is situated. This printing mechanism may be constructed in any suitable manner, and is here shown as a simplified form of the construction embodied in my application:—Ser. No. 4938. A pair of interacting rockshafts 144 and 152 are both mounted in the uprights 9 and 10. Rockshaft 144 is connected to the hinged bearing 140, that supports the typewheel-shaft 62, and is operated by the rockshaft 152, which in turn receives its motion from the arm 87 of the rockshaft 80, through the spring-actuated pawl 88. This pawl is normally held in position to be gripped by the arm 87, but may be disconnected therefrom at the will of the operator, as will be shown hereinafter.

Figures 10, 11:
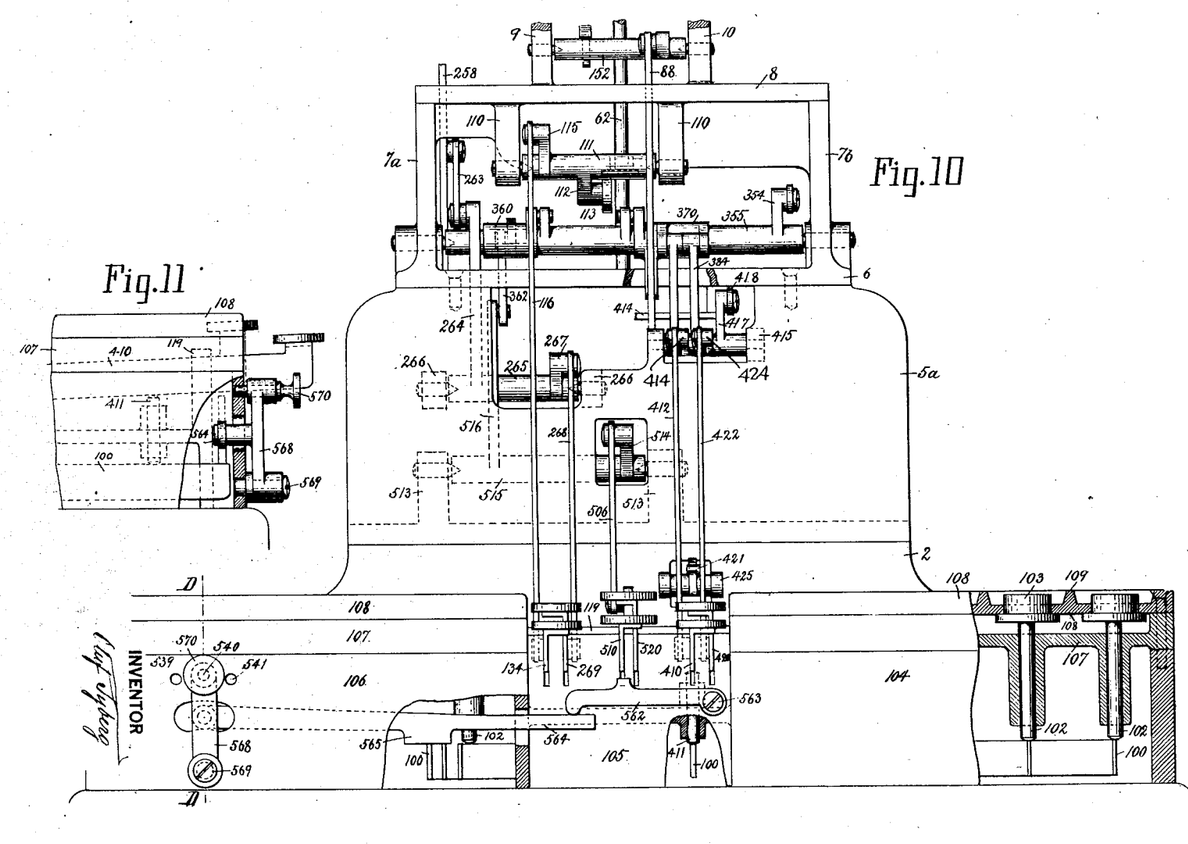
Fig. 10 is a front view of the keyboard.
Fig. 11 is a partial end view of the keyboard, partially sectioned on the line D—D of Fig. 10.

The shift mechanism may be constructed in any suitable manner. Referring to Figs. 3 and 10, it consists of a rockshaft 111, mounted between lugs 110, situated on the underside of plate 8. This rock-shaft carries an arm 112, provided with a roller 113, made to bear against the lower side of flange 63 on the typewheel shaft 62. Another arm 115 on this rockshaft is connected by rod 116 to the "shift" keylever 134, which, while depressed, keeps the lower row of types in line with the impression block 235.

Figures 6, 7, 8, 9:
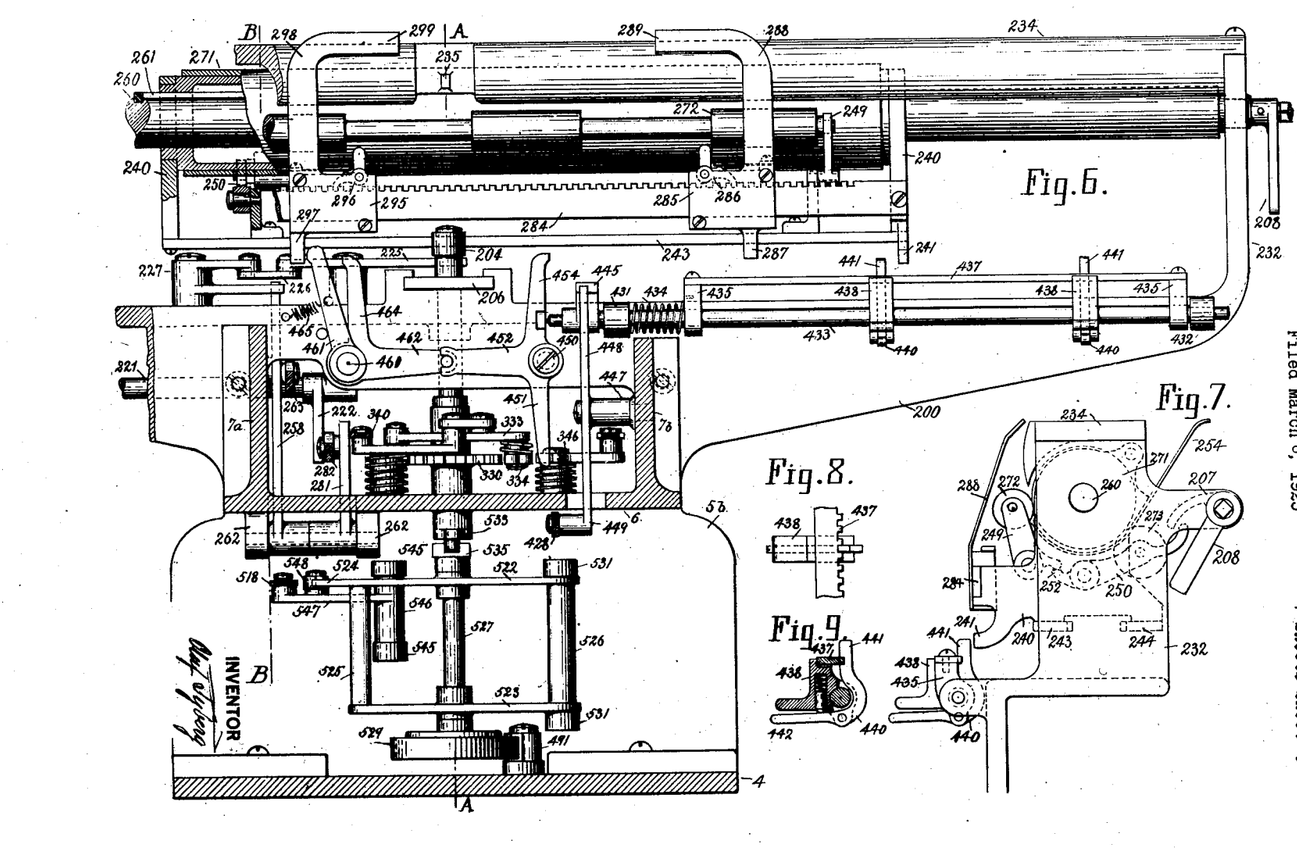
Fig. 6 is a front section of the machine on the line C—C of Fig. 1.
Fig. 7 is an end view of the right hand portion of the carriage frame.
Figs. 8 and 9 are detail views of the tabulator.

The carriage support may be constructed in any suitable manner. In my preferred construction it consists of a carriage-frame 200 in the shape of an angle-piece, that rests on the plate 6 and is fastened to the rear portion of the uprights $7^a$ and $7^b$. (Figs. 1, 6 and 7.) Resting on the top of the two end-brackets 231 and 232, that form part of the carriage frame, is the top-bar 234, which, like the carriage frame, extends the full length of the carriage travel, and supports the impression block 235. Against this impression block the printing is done as described in my application:—Ser. No. 4938. In this earlier application attention was called to distinct improvements which the introduction of a stationary platen makes possible. In addition to those mentioned there, it should be noted here, that the use of a stationary platen reduces the carriage to a paper support, whose movements lend themselves to be controlled by mechanisms of simpler and more durable construction. This advantage is of a particular importance in a power typewriter, where the demands upon the carriage operating mechanisms become more exacting, if all the carriage motions have to be controlled directly from the keyboard, such as is provided for in this typewriter. The object of this form of a carriage-frame is to provide an upright rectangular frame, inside of which the carriage is supported in such a manner as to make its construction simple, its support rigid, and its manipulation more universal. Besides this construction makes it possible to provide stationary handles, mounted upon the two ends of the carriage-frame itself, for feeding and releasing the paper on the carriage by hand, the advantage of which will become apparent, when the machine is used in connection with a permanent hood or cover, such as is disclosed in my application for "typewriter accessories" Ser. No. 13,612 bearing even date with this application.

While the construction of the carriage itself may be varied in details, my preferred construction is as follows. The main feed-roller 271 is provided with suitable end-bearings (Figs. 3 and 6) that permit it to slide freely on a feed-rod 260, supported in the two end-brackets 231 and 232. At each end of the feed roller 271 a shoulder has been turned, upon which is mounted the carriage proper. This carriage consists of two end-pieces 240, fitted to swing freely on the two shoulders of the feed-roller 271. The two end-pieces are connected by a tie rod 242, by two feed-racks 243 and 244 fastened to the bottom of the end-pieces, and by a marginal stop support 284, fastened to the front of the same. Between the two feed-racks is situated a feed-pinion 224, which controls the motion of the carriage, while the direction of this motion is determined by the feed-rack in working contact with this feed-pinion. The object of this carriage construction is to bring this direction under direct control of the operator in a manner now to be explained.

The swinging action of the carriage is controlled by two rollers 204 and 205. These rollers straddle the two feed-racks and are mounted on a flat bar 206, fitted to slide in a corresponding groove in the top of the carriage frame 200. The flat bar 206 is controlled by a forked lever 225, (Fig. 1) whose other end is connected by link 226 to another lever 227. A spring 228 keeps lever 227 against the stop 229, and therefor normally keeps the feed-rack 244 in contact with the pinion 224, which makes the carriage feed forward. Extending through an opening in the carriage frame is an arm 258, which bears against the other end of lever 227, so as to move it, and through this motion—indicated by broken lines—pushes the flat bar 206 back. This action disengages the feed-rack 244 and brings the feed-rack 243 into engagement with the feed-pinion, and causes the carriage to feed backward. The arm 258 (Figs. 3, 6 and 14) is mounted between lugs 262 on the underside of plate 6, and is connected by rod 263 to an arm 264 of a rockshaft 265, mounted in lugs 266 on the rear of the angle piece 5ª. (Figs. 3 and 10.) Another arm 267 of rockshaft 265 connects by rod 268 to the "reverse control" keylever 269, which while depressed makes the machine feed and print backward.

The manner of supporting the paper on the carriage is as follows. Fastened to the top of the two feed-racks 243 and 244 are two brackets 246, in each of which are freely mounted a pair of spring-actuated arms 249 and 250, (Figs. 1, 6 and 7) whose free ends respectively support the two pressure rollers 272 and 273. A paper guide 254 for inserting the paper and for guiding it around the feed roller 271 is fastened to the two end-pieces 240. Mounted in the rear of the two end-uprights 231 and 232 is a winged rod 207, extending the full length of the carriage travel. This rod is provided with a handle 208, fastened to the right hand end, and which when turned makes the winged portion of the rod 207 push against the curved extensions 251 of the arm 250. This action forces the pressure roller 273 away from the feed-roller 271, while this motion of the arms 250 causes a similar motion to the arms 249 through the interaction of their respective shoes 252. Hence the paper can be released in any position of the carriage by the stationary handle situated at the end of the carriage frame.

Figures 4, 5:
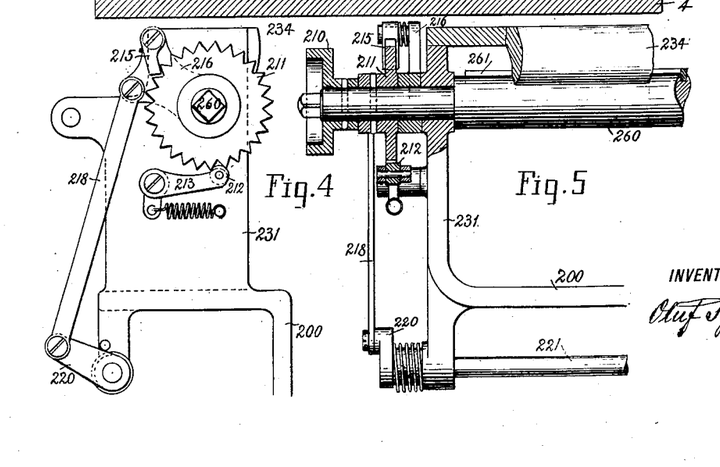
Fig. 4 is a left hand end view of the carriage frame, showing the paper feed mechanism.
Fig. 5 is a front view of the same, partially sectioned.

The paper line-feed may be constructed in any suitable way, but in my preferred construction it is as follows. The feed-rod 260 is provided with a key 261, which makes the feed-roller 271 turn with it, so that the motion of the feed-rod may feed the paper in any position of the carriage. This feeding may be done either by turning a knob or handle by hand, or automatically by power through the ratchet wheel 211. Both the knob 210 and the ratchet wheel 211 are pinned to the left-hand end of the feed-rod. (Figs. 4 and 5.) A roller 212, bearing against the teeth of the ratchet-wheel and mounted in a spring-actuated arm 213, keeps the feed-rod normally spring locked. A spring-actuated pawl 215, situated on a swinging arm 216, loosely mounted on the feed-rod, is fitted to engage the teeth in the wheel 211. The motion of the arm 216 is controlled by the rod 218, the lower end of which is connected to the arm 220 of a spring actuated feed-shaft 221, mounted in the rear of the carriage frame 200. The other end of this feed-shaft is provided with an arm 222, (Figs. 3 and 6) which forks a pin 280, fastened in an arm 281, and this arm is mounted in lugs 262, on the underside of plate 6, side by side with the arm 258 already described.

To the arm 281 is pivoted a pawl 282, whose free end is provided with a slot, in which works a pin, fastened in an arm 361, belonging to the line-feed control sleeve 360, to be referred to hereinafter. The arm 361 keeps the pawl 282 normally out of contact with the projection 94, on the arm 91 of the control actuating rockshaft. But when the control sleeve moves, it permits the pawl 282 to engage the projection 94, and each motion of the rockshaft will then cause the paper in the carriage to be fed an amount corresponding to one tooth of the ratchet-wheel.

It should be understood that while the line-feed here described only feeds the paper in one direction, some slight modifications and additions, such as intermediate gearing, with means for controlling the same and of well known construction, would make the movement here described possible of feeding the paper automatically in either direction.

The carriage-feed may be constructed in any suitable manner, and either a spring-actuated escapement or a positive feed may be utilized for the purpose. In my preferred construction I use a positive feed, in connection with which I introduce some new and useful improvements for locking and disengaging the feed motion, of which the following is a description.

Figure 15:
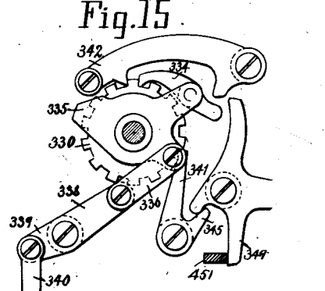
Figs. 15 and 16 show this feed mechanism in different active positions.

A ratchet-wheel 330, provided with square teeth, is fastened to a feed-shaft 331, mounted in the plate 6 and in the carriage frame 200. (Figs. 1 and 14.) To the upper end of this feed-shaft is fastened the feed-pinion 224, that moves the carriage as already described. Directly above the ratchet wheel 330, and loosely mounted upon the feed-shaft, is the feed-plate 333, provided with a spring-actuated feed-pawl 334, that engages the square teeth. The feed-plate 333 is connected by rod 336 to the arm 338 of a spring-actuated lever, centered at 337, whose other arm 339 connects, by rod 340, with the arm 91 of the actuating rockshaft 80. (See also Fig. 3.) This positive connection between the feed-plate 333 and the actuating rockshaft is so proportioned that each motion of the rockshaft 80 feeds the ratchet-wheel one tooth forward. A spring-actuated retaining-pawl 341 is centered at 303, and a spring-actuated lock-pawl 342 is centered at 304. This lockpawl, which is constructed to engage the opposite side of the teeth, carries a roller 343, resting against the cam-face 335 of the feed-plate 333. This normally keeps the lock-pawl out of contact with the ratchet-wheel. But when the feed-plate 333 begins to move forward, this cam-face is withdrawn from under the roller, and permits the lock-pawl to enter the teeth. This prevents overthrow and positively locks the ratchet wheel between the lock-pawl and the retaining-pawl, long enough for the printing to take place. This locked position is shown in Fig. 15. Only as the feed-plate returns to its normal position of rest is the lock-pawl again withdrawn from the teeth by the action of the cam-face.

From the above descriptions it should now be understood that each time the actuating rockshaft 80 moves, it normally operates the carriage-feed and the printing mechanism, but not the paper line-feed. In order to make the actuating rockshaft operate the line feed as well as spacing and feeding continuously the carriage without printing, I introduce a control mechanism consisting of three units, directly connected with the keyboard, and capable of acting either independently or together.

Figure 16:
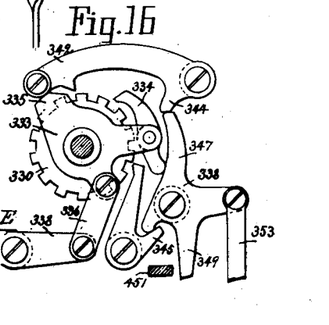

This control mechanism may be constructed in any suitable manner, but preferably it consists of a space control-plate 346, (Fig. 14) mounted on plate 6, centered at 348, and connected by rod 353 to the arm 354 of a control-shaft 355. This control-shaft is mounted on centers 356, situated in the uprights 7ª and 7ᵇ. Between shoulders on this control-shaft is loosely mounted the line feed control-sleeve 360 and the printing control-sleeve 370. They are shown in section in Fig. 17. The space control-plate 346 is normally inactive, but when moved into active position, as shown in Fig. 16, it makes the carriage feed inactive, for its arm 347 is so shaped as to bear against the tail-end of the feed-pawl 334 and to keep it from entering the teeth, while another arm of plate 346 engages the tail 345 of the retaining-pawl 341, and keeps this pawl out of contact with the teeth. Fig. 16 also shows how the extreme end of arm 347 enters the path of a projection 344 on the lock-pawl, and prevents this pawl from entering the teeth during the motion of the feed plate 333, which is always positively connected to the actuating rockshaft 80. Hence whenever the control-plate is moved into active position, the carriage feed becomes inactive, and besides the feed shaft 331 is free to move in both directions, permitting the introduction of an independent carriage return motion to be explained hereinafter.

The two control-sleeves 360 and 370 are loosely mounted on the control-shaft 355. Figs. 1, 14 and 17 show how these sleeves are respectively connected to the control-shaft by their pins 366 and 376. Pin 366 bears normally against the side of projection 367 and pin 376 bears normally against the opposite side of the corresponding projection 377; both these projections are firmly attached to the control-shaft. The sleeve 360 is provided with an arm 361, which, as has already been explained, controls the line-feed pawl 282, and keeps it normally out of engagement with the rockshaft 80. The sleeve 370 has a downward projecting arm 371, against which rests the pawl 88, that connects the rockshaft 80 with the printing mechanism. In another arm 372 of this sleeve is pivoted two pawls 374 and 384. These two pawls are guided in a plate 413, fastened below plate 6, while two flat springs 375 keep both these pawls and the sleeve itself in their normal position shown in Fig. 1.

The spacing mechanism in this machine consists of a key, which disengages the printing mechanism at the same time as it performs the action of a regular impulse key, which is that of causing the actuating rockshaft to move once, by releasing a corresponding stop-pawl, in the manner explained in my prior application. The "space" key is attached to the control keylever 410, and is shown in Figs. 1, 10, 11 and 12. In Fig. 11 this key-lever is shown resting on a plunger 411, which in turn rests upon one of the impulse keylevers 100. In Figs. 1 and 10 this keylever is shown connected by rod 412 to an arm 414 of a spring-actuated lever, pivoted at 415 on the front upright 5ª. The other bent arm 416 of this lever rests directly beneath the pawl 374. When the "space" key is depressed, the arm 416 lifts the pawl 374, and causes the control-sleeve 370 to swing about. This makes the arm 371 push the pawl 88 free from contact with the arm 87. This motion of the control sleeve does not affect the control-shaft 355, for the pin 376 moves away from the projection 377. Hence whenever the "space" key is depressed the printing mechanism is made inoperative and only the feed mechanism remains active. In order to make the "space" key automatically self-restoring like the printing keys, as explained in prior applications, the following construction is introduced. Connected to rockshaft 80 is an arm 95, (Figs. 1 and 14) to which is pivoted a pawl 97. The free end of th's pawl rests on the plate 413, and moves in the same vertical plane as the pawl 374. Normally the pawl 97 moves back and forth with the motion of the rockshaft 80 without touching the pawl 374, but when the "space" key is depressed and the arm 416 has lifted the pawl 374, its shoulder 387 enters the path of the moving pawl 97, and pushes it out of contact with the arm 416, as shown in Fig. 2. This automatically restores the control-sleeve 370 to its normal position, and makes the printing mechanism operative whether the finger remains on the "space" key or not.

Figure 12:
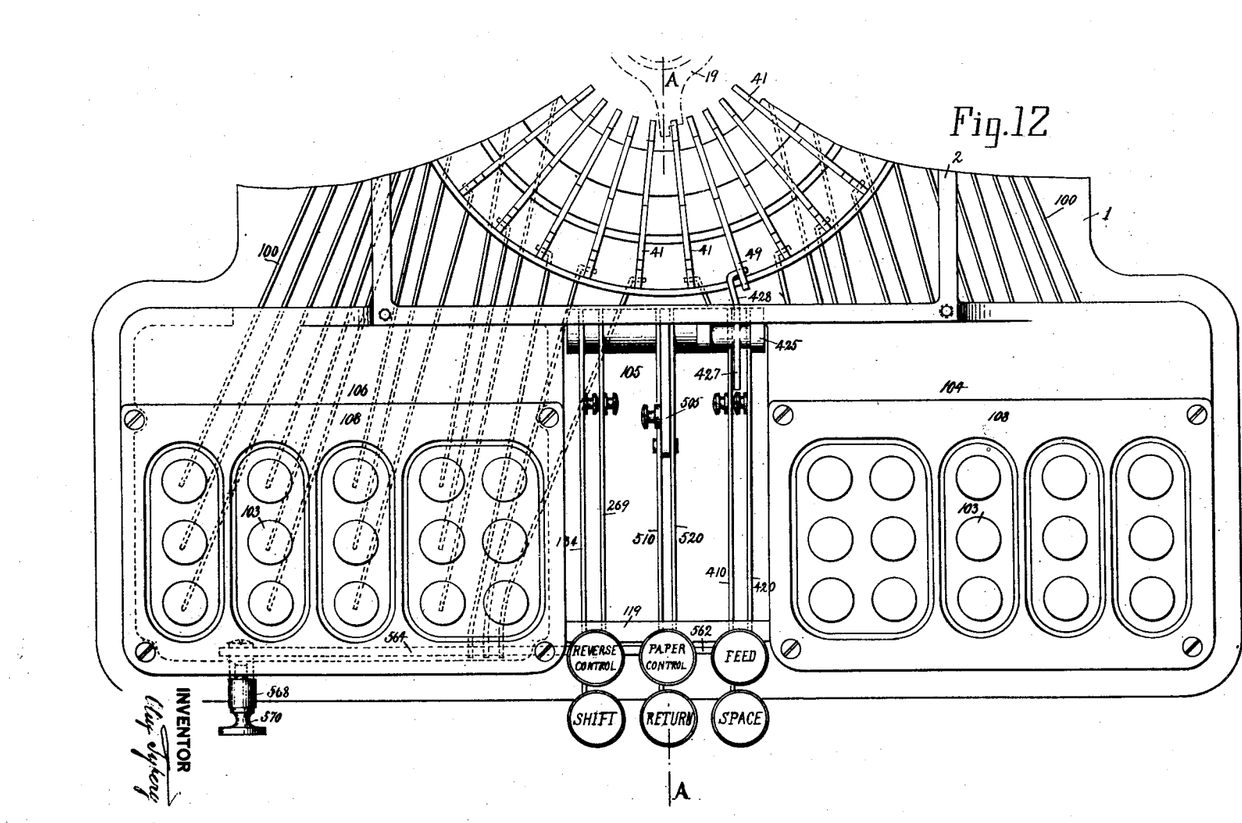
Fig. 12 is a top view of the keyboard.
Figure 13:
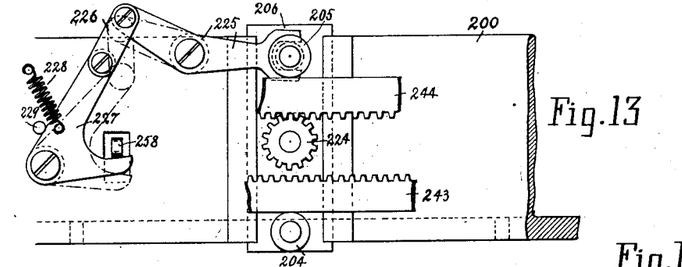
Fig. 13 is a top view of a portion of the carriage frame, showing parts of the carriage reverse mechanism.

The continuous feed mechanism is as follows. Next to the "space" key is the "feed" key, mounted on keylever 420. (Figs. 1, 10 and 12). This keylever is connected by rod 422 to the arm 424 of a second lever, pivoted at 415, whose other arm 426 is fitted to engage the second pawl 384, mounted in the control-sleeve 370. A pin 421, on the connecting rod 422 is straddled by an arm 427 of a tripping-lever, pivoted at 425, whose other bent arm 428 rests beneath an extension 49 of one of the stop-pawls 41. When the "feed" key is depressed it permanently unhooks the stop-pawl to which belongs this extension, for this manner of unhooking a stop-pawl prevents it from assuming its normal hooked position of rest, when pushed back by the eccentric motion of the armed sleeve 19, after one single revolution of the rotary carrier 13, which otherwise is one of the particular features of this stop-pawl construction, as explained in my prior application. Hence this stop-pawl is permitted to maintain a permanent grip upon the armed sleeve, and the result is a continuous vibratory motion of the actuating-rockshaft 80, that makes the spacing continuous as long as the "feed" key is depressed.

It will now be understood that the result of depressing the "reverse control" key and keeping it depressed while manipulating either the "space" key or the "feed" key, is to cause corresponding backward movements of the carriage, just as the manipulation of the printing keys—with the "reverse control" key depressed—causes the machine to print backward.

It should also be understood that by adding an extention 49, such as has been described, to other stop-pawls, such as control the printing of certain signs or characters, and by means of separate keylevers for manipulating them, it is possible to print any such signs or characters continuously.

As the carriage-feed is positive in both directions, an automatic and adjustable marginal stop motion is provided for positively arresting the carriage feed and printing at both ends of the line. In my preferred construction the general arrangement of this stop-mechanism is as follows. Mounted on the front of the carriage-frame 200, and directly above the control-plate 346 as shown in Fig. 6 is a bell crank, centered at 450. Its downwardly projecting arm 451 bears directly against an arm 349 of the control plate 346. (Fig. 14.) Another arm 452 straddles a pin on the arm 462 of another bell-crank, loosely mounted on a shaft 460. The shaft 460 will be referred to hereinafter in connection with the carriage return motion. Mounted on the marginal stop-support 284 of the carriage are two adjustable marginal stops 285 and 295. They are constructed to slide on the support and are provided with spring-actuated pawls 286 and 296, that fit the teeth in the support, so that these stops can be locked in different positions, and thus determine the length of the line to be printed. These marginal stops are provided with downwardly projecting shoes 287 and 297, as well as upwardly L-shaped extensions 288 and 298. These extensions, which besides acting as guides for the paper after it leaves the feed rollers, are so proportioned that their inner edges 289 and 299 become definite indicators, showing the exact positions of the two printing margins directly upon the paper itself. When the carriage, in its forward motion reaches the end of the line, as determined by the position of the marginal stop, the shoe 287 on this stop will have reached the arm 454 of the bell-crank, centered at 450, and when striking it, cause its lower arm 451 to push the control-plate 346 into the position shown in Fig. 16. This disengages the carriage feed mechanism as already explained. But it also disconnects the printing mechanism, for the motion of the control-plate also moves the control-shaft 355 through the rod 353. This causes the projection 377 on the control shaft, acting on the pin 376, to move the control-sleeve 370, and to disengage the printing mechanism. When now either a printing key or the "space" key is struck, the motion of the actuating rockshaft 80 will have no effect until the carriage has been returned to the beginning of a new line. When the carriage is fed backward, and the left-hand margin is reached, the shoe 297 on the marginal-stop 295 strikes the upwardly extending arm 464 of the bell crank that is centered at 460. Its connection with the other bell crank, as already explained, similarly disengages both the spacing and the printing mechanism.

The tabulator is operated positively by the depression of the "feed" key, and the means for adjusting it are all conveniently situated in the front of the machine. Its detailed construction may be varied, but preferably it is as follows. Mounted on the front part of the carriage-frame 200, (Figs. 6 and 7) are two lugs 431 and 432, in which is mounted the tabulator shaft 433. This shaft is free to turn and to move endwise in the lugs, and it is provided with two arms 435, that support the two ends of a rack 437. Two shoes 438 (the number of shoes may be varied to suit requirements) are slidingly mounted on shaft 433. Each of these shoes (Figs. 8 and 9) is provided with a spring-actuated pawl 440, whose upright portion is made to enter the teeth of the rack, and lock the shoes in any desired position on the rack. The tabulator-shaft 433 extends out beyond the lug 431, and close up to the bell-crank arm 454. To this extension is attached an arm 445, while opposite the lug 431, is a spring 434 for controlling the shaft tortionally as well as endwise. It therefor keeps the tabulator-shaft normally away from the arm 454, and at the same time keeps the arm 445 normally resting against the arm 448 of a lever, mounted at 447 in the upright 7ᵇ. The lower arm 449 of this lever, (Fig. 6) is connected by rod 418 to a third arm 417 of the lever mounted at 415, which connects with the "feed" keylever 420, as already described. The pawls in the shoes 438 extend up above the rack, and their ends 441, when the tabulator is in its normal position, just clear of the path of a projection 241 on the carriage. This projection is here shown as forming part of the end-piece 240, but may be made a detachable piece, capable of being swung out of the way when the tabulator is not in use. When depressing the "feed" key, the connection just described, causes the tabulator to swing about on its own axis and to bring the pawl ends 441 into the path of the projection 241. As the carriage now proceeds forward by the action of the continuous feed, the projection 241 will strike the first pawl, and force the tabulator-shaft to push against the arm 454 of the bell-crank that makes the feed mechanism inoperative. The removal of the finger from the "feed" key at once releases the tabulator from the projection 241, and makes the feed-mechanism again active, so that a renewed depression of the "feed" key permits the carriage to proceed again until the next stop on the tabulator is reached, and so forth.

The means for independently operating the paper line-feed directly from the keyboard are as follows. As already explained the control-sleeve 360 keeps the line-feed mechanism normally inactive by holding the pawl 282 out of contact with projection 94 on the actuating rockshaft 80. (Fig. 3.) The control-sleeve 360 has a downward extending arm 362, the slotted end of which straddles a pin 517, fastened to an arm 516 of a rockshaft 515, mounted in lugs 513, situated on the upright 5ᵃ. Another arm of this rockshaft is connected to a plate 505 by means of the rod 506. Plate 505 is pivoted at 118 together with the control keylevers. On each side of plate 505 (see Figs. 1 and 12) and resting on a pin 507, inserted through the plate, are two control keylevers 510 and 520. The left-hand lever 510 has a key marked "return" and will be referred to hereinafter, while the right-hand keylever 520 has a key marked "paper control." When this latter key is depressed, it pushes the plate 505 down with it. This causes the control-sleeve 360 to move and to permit the pawl 282 to enter the path of the projection 94, in other words it makes the line-feed mechanism active, at the same time as it makes the printing and the spacing mechanism inactive. For the motion of sleeve 360 forces the control-shaft 355 to move with it, as the pin 367 on this sleeve is so situated as to push against the projection 366 on the control shaft. This motion of the control-shaft causes both the control-sleeve 370 (through projection 377 and pin 376) and the control plate 346 (through rod 353) to move. It should therefore be understood that whenever the "paper control" key is depressed, the additional depression of the "space" key will cause the actuating rockshaft 80 to move once, and cause the paper to be fed forward an amount corresponding to one tooth of the ratchet wheel 211. If instead, the "feed" key had been depressed, the rockshaft 80 will continue to move, and continue to feed the paper in the carriage. In either case the carriage itself will remain stationary in whichever position it happens to be.

From the foregoing it will now be understood that I employ three distinct and independent mechanisms for spacing, printing and feeding the paper, but all operated from the same source, namely the actuating rockshaft; and in addition to these a control for making each and all of these mechanisms inactive, and capable of being operated either by the motion of the carriage or directly from the keyboard. This control is capable of assuming the following distinct positions.

(1) The normal position in which the control keeps the spacing and the printing mechanisms active and the line-feed inactive.

(2) The position obtained, when the end of the line is reached and the carriage operates the control, and all three mechanisms become inactive.

(3) The position obtained by depressing either the "space" key or the "feed" key, when the line-feed and printing mechanisms become inactive, and only the spacing mechanism active.

(4) The position obtained by depressing the "paper control" key, when the spacing and the printing mechanisms become inactive and only the line-feed active.

The motion for quickly returning the carriage at the end of the line, may be constructed in various ways, but in my preferred construction it is as follows. Hinged in a pair of lugs 531, situated on the front side of the rear upright 5$^b$ is a friction-frame (Figs. 1, 3, 6 and 12) consisting of two bearings 522 and 523 connected by two tie-rods 525 and 526. Mounted in these bearings and situated directly below and in line with the feed-shaft 331, is a friction-shaft 527, to the lower end of which is fastened the friction-wheel 529. This friction-wheel is situated in close proximity and opposite to a friction-band 23, secured to the rotary carrier 13. A spring 536 keeps the friction-frame resting against a stop 532, and thus keeps the friction wheel normally out of contact with the friction-band. As the shaft 527 is situated in a movable frame, and has to revolve with the feed-shaft 331, these two shafts are connected by means of a pin-clutch, consisting of an arm 533, fastened to the lower end of the feed-shaft 331, and provided with a pin 534, that fits the groove in another arm 535, fastened to the upper end of the friction-shaft 527. The manner of operating the friction-frame is as follows. Mounted between lugs 545, also situated on the upright 5$^b$, is a rockshaft 546, whose one arm 547 supports a spring-actuated pawl 538, fitted to bear against a hook 524, situated on an extension of the upper bearing 522 of the friction frame. The extreme end of arm 547 is connected by rod 518 to the arm 516 of the rockshaft 515 in the upright 5$^a$, which as already explained is controlled by the key-levers 510 and 520. The depression of either one of these keylevers will operate the control as already explained, and hence make the feed-shaft 331 free to move in either direction. But only the keylever 520, which is free to move further than the keylever 510, is able to move the friction-frame sufficiently to produce contact between the friction-wheel and the friction-band, and to cause the friction-shaft, through connections already described, to return the carriage quickly to the beginning of the line.

In order that the carriage, when being returned by this quick return motion, shall stop always at the right place without jar and while the "return" key is still depressed, I employ an automatic friction release mechanism together with a specially constructed frictional locking device, both of which are operated by the marginal stop. While the detailed arrangement of these two mechanisms may be varied, in my preferred construction they are as follows.

The frictional release mechanism consists of a shaft 460, mounted in the carriage frame 200, (Figs. 3, 6, 18 and 19). To the front-end of this shaft is attached a stop-arm 461 and to the rear end a cam-arm 462. The stop-arm is in line with the marginal-stop-shoe 297, and the cam-arm is made to act upon a pin 482, fastened in the upper portion 481 of a lever centered at 480, on the rear of upright 5$^b$. The lower arm 485 of this lever is made to push against a rear extension 537 of the pawl 538. This pawl has already been referred to as controlling the action of the friction-frame, when the "return" key is depressed. As the carriage is being returned by the friction-wheel, the marginal stop 295 will hit the stop arm 461, and in moving it will cause the pawl 538 to be released from the friction-frame while the "return" key is still depressed. But there is still the momentum of the carriage to be overcome, and if this be attempted by means of a solid stop, both jar and rebound would result. To overcome this I introduce a frictional locking device.

The frictional locking device consists of a friction-shoe 491, (Figs. 18 and 19) pivoted at 490 on the plate 4, and which while normally out of contact with friction-wheel 529, is so shaped as to be able to bear against it. At 495 on the rear upright 5$^b$, and directly above this friction shoe, is mounted a lever, whose lower arm 494 is made to act upon a rear extension 492 of the friction-shoe, but normally kept away from it by the spring 493. Pivoted at O', on the upper portion 496 of this lever, is a double link 497. Its lower arm is connected at P' to the rear arm 549 of the rock shaft 546, by the rod 498; while its upper arm is connected at N' to the arm 481 of the lever centered at 480, by the connecting rod 499. When the "return" key is depressed, the rockshaft 546 is moved, and through its connecting rod 498 causes the double link 497 to assume the position N' O$^2$ P$^2$, as indicated by broken lines in Fig. 19. This moves the lever and brings its lower arm 494 closer to the friction shoe. As the carriage reaches the limit of its return, and the friction has been released, the momentum of the carriage continues to move the stop-arm 461. This causes the cam-arm 462 to move the arm 481. As this arm is connected to the upper end of the double link, it forces this link into the position N$^2$ O$^3$ P$^2$, in which position the lever has moved sufficient to force the friction-shoe against the friction-wheel, and to stop and completely lock the carriage. But as soon as the "return" key is released, the lower portion of the double link is again permitted to return to its normal position, and this at once releases the carriage, and permits it to be spaced forward again.

In order to feed the paper to the next line each time the carriage is being returned by the quick return motion, and also to be able to vary the space between the lines, I employ the following preferred construction. Situated on the front portion of the keyboard-section 105 is an arm 562, (Fig. 10) pivoted at 563, whose upper portion is so shaped as to be acted upon only by the key-lever 510, when the "return" key is depressed. The end of arm 562 rests upon another arm 564, pivoted on the hub of an adjustable arm 568. (Figs. 11 and 12.) This adjustable arm is mounted at 569 on the keyboard-section 106, and its free end is provided with a lock-pin 570, which is made to fit either one of three holes 539, 540 and 541, drilled in the front of the keyboard, and which permits the arm to assume either one of three positions. Three of the impulse keylevers 100 have been extended out towards the front of the keyboard, and a projection 565 on the underside of arm 564 is fitted to rest on them, in order that either one, two or three levers may be acted upon at once, according to the position of the arm 568. The position in the drawing shows this arm in the middle position, and the arm 564 acting upon two impulse keylevers. (It should be understood that the number of keylevers and adjustable positions need not be limited to three.) When the "return" key is depressed, its keylever 510 pushes the arm 562 and causes the arm 564 to depress the number of keylevers it has been adjusted to act upon. These keylevers release a corresponding number of stop-pawls 41, each of which in turn causes the actuating rock-shaft to move once. As these motions take place while the carriage is being returned, the control shaft is in position to keep the spacing and the printing mechanisms inactive, and only the line-feed mechanism active, and the paper will therefore be fed forward the predetermined number of notches.

Having thus fully described my invention, what I claim as new and useful is:—

1. In a typewriter the combination of a rotated typewheel, a stationarily mounted platen, a carriage for supporting the paper, mechanism for operating said carriage, mechanism for line-feeding the paper, mechanism for bringing any selected type of said typewheel in contact with said platen, and key-controlled power-driven means for selectively operating any of said mechanisms.

2. In a typewriter the combination of a frame, a paper-carriage slidingly mounted upon a rod whose ends are secured in said frame, a stationary platen mounted upon said frame, a rotated typewheel, mechanism for operating said carriage, mechanism for line-feeding said paper, mechanism for bringing any selected type of said typewheel in contact with said platen, and key-controlled power-driven means for selectively operating any of said mechanisms.

3. In a typewriter the combination of a frame, a revolving rod whose ends are secured in said frame, a paper-carriage slidingly mounted upon said revolving rod, a stationary platen mounted upon said frame, a rotated typewheel, mechanism for operating said carriage, mechanism for line-feeding the paper through said revolving rod, mechanism for bringing any selected type of said typewheel in contact with said platen, and key-controlled power-driven means for selectively operating any of said mechanisms.

4. In a typewriter the combination of a continuously rotated driver, a key-controlled actuator intermittently operated by said driver, a printing mechanism, a carriage-spacing mechanism, a paper line-feed mechanism, and key-controlled means for selectively causing said actuator to operate any of said mechanisms.

5. In a typewriter the combination of a continuously rotated driver, a key-controlled actuator intermittently operated by said driver, a paper-carriage mounted in a frame extending beyond the carriage travel, a stationary platen supported by said frame, a printing mechanism, a carriage spacing-mechanism, a paper line-feed mechanism, and key-controlled means for selectively causing said actuator to operate any of said mechanisms.

6. In a typewriter the combination of a continuously rotated driver, a paper-carriage, a typewheel, a type-selecting device, a printing mechanism, a carriage-spacing mechanism, a paper line-feed mechanism, and key-controlled means for selectively operating any of said mechanisms from said driver through said selecting device.

7. In a typewriter the combination of a continuously rotated driver, a typewheel and an armed sleeve independently mounted on said driver, key-controlled means for arresting the motion of said armed sleeve at different points of rotation, an actuator operated by said sleeve while arrested, a printing mechanism, a carriage-spacing mechanism, paper line-feed mechanism, and key-controlled means for selectively causing said actuator to operate any of said mechanisms.

8. In a typewriter the combination of a continuously rotated driver, an actuator operated by said driver, key-controlled means for making said actuator operate intermittently or continuously, mechanisms for carriage-spacing and paper line-spacing operated by said actuator, and key-controlled means for selectively operating either of said mechanisms intermittently or continuously.

9. In a typewriter the combination of a paper-carriage, a power-driven carriage-return running mechanism, a paper line-feed to be operated a definite amount by each motion of an intermittently working power-driven actuator, a "return" key for controlling said carriage-return and said actuator, and means for regulating the number of motions of said actuator when said "return" key is depressed.

10. In a typewriter the combination of a continuously rotated driver, an actuator operated by said driver, key-controlled means for making said actuator operate intermittently or continuously, mechanism for line-spacing operated by said actuator, a power-driven carriage-return running mechanism, a "return" key for controlling said carriage-return, and means for regulating the number of motions of said actuator when said "return" key is depressed.

11. In a typewriter the combination of a power-driven printing mechanism controlled from a keyboard by means of a series of key-levers, a paper-carriage, a power-driven line-spacer, a power-driven carriage-return running mechanism under control of a "return" key, means controlled by said "return" key for disengaging said key-levers from said printing mechanism and for making the depression of each of said key-levers control the line-feed spacing.

12. In a typewriter the combination of a power-driven line-spacing mechanism under direct key-control, a power-driven carriage-return running mechanism controlled by a "return" key, adjustable connections interposed between said "return" key and said line-spacing mechanism for operating said line-spacing during said carriage-return and for regulating the amount of line-spacing.

13. In a typewriter the combination of a continuously rotated driver, an actuator operated by said driver, key-controlled means for making said actuator operate intermittently or continuously, mechanism for carriage-spacing and for line-spacing operated by said actuator, a power-driven carriage-return running mechanism controlled by a "return" key, means for making said actuator operate said line-spacing mechanism when said "return" key is depressed, and a regulator for determining the number of intermittent motions to be made by said actuator.

14. In a power-driven typewriter the combination of a carriage-return running mechanism, a paper line-feed mechanism, a "return" key for controlling the motion of said mechanisms, and a line-feed regulator situated upon the keyboard and connected with said "return" key.

15. In a typewriter the combination of a power-driven key-controlled pawl and ratchet mechanism for operating the line-spacing, a power-driven key-controlled carriage-return running mechanism, a regulator for determining the number of ratchet motions to be imparted to said line-spacing mechanism during the return of said carriage, and means for operating said line-spacing mechanism once or continuously independent of said carriage-return motion.

16. In a typewriter the combination of a continuously rotated driver, a key-controlled actuator intermittently operated by said driver, a carriage, a force-feed spacing mechanism including a feed-shaft operated in one direction only by said actuator, and key-controlled means for connecting said feed-shaft to said carriage in such a way as to cause said actuator to space said carriage in either direction.

17. Claim 16 in combination with key-controlled means for operating said actuator continuously.

18. In a typewriter the combination of a continuously rotated driver, a key-controlled actuator intermittently operated by said driver, a carriage provided with two feed-racks, a spacing mechanism including a pinion operated by said actuator, means for normally connecting said pinion with one of said feed-racks, and key-controlled means for bringing said pinion in engagement with the other feed-rack.

19. In a typewriter the combination of a continuously rotated driver, an actuator mounted upon and intermittently operated by said driver, and key-controlled mechanisms for letter-spacing and for line-spacing to be selectively operated by said actuator.

20. In a typewriter the combination of a continuously rotated driver, an actuator mounted upon and operated by said driver, key-controlled mechanisms for letter-spacing and for line-spacing to be selectively operated by said actuator, and key-controlled means for making said actuator operate once or continuously.

21. In a typewriter the combination of a continuously rotated driver, an actuator mounted upon and operated by said driver, key-controlled mechanism for spacing the carriage in either direction to be operated by said actuator, and key-controlled means for making said actuator operate once or continuously.

22. In a typewriter the combination of a continuously rotated driver, an actuator mounted upon and intermittently operated by said driver, and key-controlled mechanisms for line-spacing and for spacing the carriage in either direction to be selectively operated by said actuator.

23. In a typewriter the combination of a continuously rotated driver, an actuator mounted upon and operated by said driver, key-controlled mechanisms for line-spacing and for spacing the carriage in either direction to be selectively operated by said actuator, and key-controlled means for making said actuator operate once or continuously.

24. In a typewriter the combination of a continuously rotated driver, an actuator mounted upon and intermittently operated by said driver, and key-controlled mechanisms for line-spacing, for spacing said carriage in either direction, and for printing to be selectively operated by said actuator.

25. In a typewriter the combination of a continuously rotated driver, an actuator mounted upon and operated by said driver, key-controlled mechanisms for line spacing, for spacing the carriage in either direction and for printing to be selectively operated by said actuator, and key-controlled means for making said actuator operate once or continuously.

26. In a typewriter the combination of a stationary platen, a carriage slidingly mounted upon a revolving rod, means for controlling the motion of said carriage, means for feeding the paper by revolving said rod, and key-controlled power-driven mechanism for operating said means.

27. In a typewriter the combination of an open rectangular frame, a revolvable rod mounted in the ends of said frame, a feed-roller mounted to slide upon and revolve with said rod, a paper-carriage for supporting the pressure roller and for controlling the motion of said feed-roller, a stationary platen supported by said frame, means for printing against said platen, means for operating said carriage, means for revolving said rod, and key-controlled power-driven mechanism for operating said means.

28. In a typewriter the combination of a carriage provided with feed-rollers and mounted in a frame extending beyond the ends of the carriage travel, a rod for revolving said feed-rollers, means for releasing the paper in said feed-rollers, a handle for controlling said means, a handle for said rod, and both said handles mounted beyond the ends of said frame.

29. In a typewriter the combination of a revolvable rod, a feed-roller mounted to slide upon and revolve with said rod, a paper-carriage comprising two end-pieces joined by a pair of feed-racks and hung on said feed-roller, means for controlling the motions of said carriage through either one of said feed-racks, and means for controlling the motion of said revolvable rod.

30. In a typewriter the combination of a stationary platen, mechanism for printing against said platen, a paper carriage slidingly mounted on a revolvable rod and provided with two feed-racks, mechanism for controlling the motions of said carriage through either one of said feed-racks, a paper line-feed mechanism operating through said rod, and key-controlled power-driven means for operating said mechanisms.

31. In a typewriter the combination of a continuously rotated driver and a key-controlled spacing mechanism operated by said driver, said spacing mechanism comprising a toothed wheel, a feed-pawl, a retaining-pawl, a lock-pawl working upon the side of the teeth opposite to that acted upon by said feed-pawl and normally out of engagement with said teeth, and means for permitting said lock-pawl to enter said teeth during the forward motion of said feed-pawl for the purpose of preventing overthrow.

32. In a typewriter the combination of a continuously rotated driver and a key-controlled spacing-mechanism operated by said driver, said spacing mechanism comprising a ratchet-wheel provided with square teeth, a feed-pawl, a retaining pawl, a lock-pawl working upon the side of the teeth opposite to that acted upon by said feed pawl, means for keeping said lock-pawl normally out of contact with said teeth except during the forward stroke of said feed-pawl.

33. In a typewriter the combination of a continuously rotated driver and a key-controlled spacing-mechanism operated by said driver, said spacing mechanism comprising a ratchet-wheel, a feed-pawl mounted upon a movable arm, a retaining pawl, a lock-pawl, and a cam-face upon said movable arm which only permits said lock-pawl to enter said teeth during the forward motion of said feed-pawl.

34. In a typewriter the combination of a continuously rotated driver, a key-controlled actuator intermittently operated by said driver, a spacing mechanism comprising a toothed wheel, a feed-pawl positively connected to said actuator, a retaining-pawl, a lock-pawl, and key-controlled means for keeping all said pawls out of contact with said wheel during the motion of said actuator.

35. In a typewriter the combination of a continuously rotated driver, a key-controlled actuator intermittently operated by said driver, a spacing mechanism comprising a toothed wheel, a feed-pawl positively connected to said actuator, a retaining-pawl, a lock-pawl normally out of engagement with said toothed wheel and acting upon the side of the teeth opposite to that acted upon by the feed-pawl, and means for permitting said lock-pawl to enter said teeth during the forward motion of said feed-pawl.

36. Claim 35 in combination with key-controlled means for keeping all said pawls out of contact with said wheel during the motion of said actuator.

37. In a typewriter the combination of a continuously rotated driver, a key-controlled actuator intermittently operated by said driver, a carriage, a force-feed mechanism for spacing said carriage in either direction by means of a single feed-pawl positively connected to said actuator, and adjustable marginal stops for making said feed-pawl inactive at either end of the line during the motion of said actuator.

38. In a typewriter the combination of a continuously rotated driver, an actuator mounted upon and operated by said driver, a carriage-spacing mechanism operated by said actuator and controlled from a keyboard, and said keyboard containing a "space" key and a "feed" key which while respectively depressed cause said spacing mechanism to produce single and continuous spacing.

39. In a typewriter the combination of a keyboard-controlled power-driven carriage-spacing mechanism, and a keyboard containing a "space" key and a "feed" key for single, continuous spacing and a "reverse control" key, and means whereby said reverse control key while depressed transforms said "space" and "feed" keys into keys for similarly spacing the carriage in opposite direction.

40. In a typewriter the combination of a continuously rotated driver, an actuator mounted upon and operated by said driver, key-controlled printing and carriage-spacing mechanisms operated by said actuator, and a keyboard containing a "reverse control" key, and means whereby said reverse control key while depressed causes the machine to space backwards when either the spacing or printing keys are manipulated.

41. In a typewriter the combination of a power-driven carriage-spacing mechanism controlled by a "space" key, a power-driven paper line-spacing mechanism, and a "paper control" key, and means whereby said reverse control key while depressed transforms said "space" key into a key for controlling the paper line-spacing.

42. In a typewriter the combination of a power-driven carriage-spacing mechanism controlled by a "space" key and a "feed" key for respectively producing single and continuous carriage-spacing, a power-driven paper line-spacing mechanism, and a "paper control" key, and means whereby said reverse control key while depressed transforms said "space" and "feed" key into keys for similarly controlling the paper line-spacing.

43. In a typewriter the combination of a power-driven carriage-spacing mechanism, a power-driven paper line-feed mechanism, a "space" key for spacing said carriage, and key-controlled means for transforming said "space" key into a similar key for either carriage back-spacing or paper line-spacing.

44. In a typewriter the combination of a power-driven carriage-spacing mechanism, a power-driven paper line-feed mechanism, a "space" key and a "feed" key which while respectively depressed cause said carriage-spacing mechanism to produce single and continuous spacing, and key-controlled means for transforming said "space" and "feed" keys into keys for similarly controlling either the carriage back-spacing or the paper line-spacing.

45. In a typewriter the combination of a power-driven carriage-spacing mechanism, means including a "feed" key for making said spacing mechanism work continuously, and a tabulator operated by said "feed" key.

46. In a typewriter the combination of a continuously rotated driver, an actuator intermittently operated by said driver, a carriage-spacing mechanism operated by said actuator, means including a "feed" key for making the motion of said actuator continuous, a control for making said spacing mechanism inactive during the motion of said actuator, and a tabulator operated by said "feed"-key and acting upon said control.

47. In a typewriter the combination of a continuously rotated driver, an actuator intermittently operated by said driver, key-controlled means for making said actuator operate continuously, a carriage, mechanism for spacing said carriage in either direction positively connected with said actuator, a control for making said spacing inactive during the motion of said actuator, and marginal stops for operating said control.

48. In a typewriter the combination of a continuously rotated driver, an actuator intermittently operated by said driver, means including a "feed" key for making the motion of said actuator continuous, a carriage-spacing mechanism operated by said actuator, a control for making said spacing inactive during the motion of said actuator, marginal stops for operating said control, and a tabulator to be operated by said "feed" key and to operate through said control.

49. In a typewriter the combination of a carriage, a spacing mechanism mounted on a feed-shaft connecting with said carriage, a continuously rotated driver, an independently mounted shaft in line with and operatively connected with said feed-shaft, a friction-wheel on said independent shaft, and key-controlled means for forcing said friction-wheel against said driver for the purpose of returning said carriage by rotating said feed-shaft.

50. Claim 49 in combination with a marginal stop for releasing said friction at the end of said carriage return.

51. In a carriage-return running mechanism the combination of a rotary driver, a carriage, a marginal stop, a feed-shaft, a friction wheel operatively connected with said feed-shaft and normally out of contact with said driver, key-controlled means for revolving said feed-shaft by bringing said friction wheel into contact with said driver, means controlled by said marginal stop for (1) releasing said running mechanism from its key-control and (2) for bringing a frictional pressure to bear against said feed-shaft.

52. In a key-controlled power-driven carriage-return running mechanism the combination of a feed-shaft, a marginal stop, means controlled by said marginal stop for (1) releasing said running mechanism from its key-control before the end of said carriage return and (2) for bringing a frictional pressure to bear against said feed-shaft.

53. In a typewriter the combination of a key-controlled carriage return running mechanism operated by a continuously rotated driver, and an actuator intermittently operated by said driver for selectively operating a key-controlled printing-mechanism, a key-controlled carriage-spacing mechanism, and a key-controlled line-spacing mechanism.

54. In a typewriter the combination of a key-controlled power-driven actuator, a printing mechanism, a carriage spacing mechanism, a paper line-feed mechanism, operative connections between said mechanisms and said actuator, and selective means for making any or all said mechanisms inactive during the motion of said actuator.

55. In a typewriter the combination of a key-controlled power-driven rockshaft, means for making said rockshaft operate intermittently or continuously, a printing mechanism, a carriage-spacing mechanism, a paper line-feed mechanism, operative connections between said mechanisms and said rock-shaft, and selective means for making any or all said mechanisms inactive during the motion of said rockshaft.

56. In a typewriter the combination of a printing mechanism, a carriage spacing mechanism, a paper line-feed mechanism, a rotary driver, an armed sleeve normally revolving with said driver, means for arresting the motion of said armed sleeve, means controlled by said armed sleeve while arrested for operating said mechanisms, and selective means for making any or all said mechanisms inactive while said armed sleeve is arrested.

Signed by me at Point Loma, California, February, 1925.

OLUF TYBERG.